(12) United States Patent
Schmertz et al.

(10) Patent No.: US 10,850,800 B2
(45) Date of Patent: Dec. 1, 2020

(54) BICYCLE DRIVETRAIN

(71) Applicants: John C. Schmertz, Pittsburgh, PA (US); Robert Godfrey Schmertz, Greenbelt, MD (US)

(72) Inventors: John C. Schmertz, Pittsburgh, PA (US); Robert Godfrey Schmertz, Greenbelt, MD (US)

( * ) Notice: Subject to any disclaimer, the term of this patent is extended or adjusted under 35 U.S.C. 154(b) by 240 days.

(21) Appl. No.: 15/902,032

(22) Filed: Feb. 22, 2018

(65) Prior Publication Data

US 2018/0244340 A1    Aug. 30, 2018

Related U.S. Application Data

(60) Provisional application No. 62/600,419, filed on Feb. 22, 2017.

(51) Int. Cl.
| | |
|---|---|
| *B62M 1/30* | (2013.01) |
| *F16D 41/24* | (2006.01) |
| *B62M 9/02* | (2006.01) |
| *B62M 11/02* | (2006.01) |

(52) U.S. Cl.
CPC ............... *B62M 1/30* (2013.01); *B62M 9/02* (2013.01); *B62M 11/02* (2013.01); *F16D 41/24* (2013.01)

(58) Field of Classification Search
CPC .......... B62M 1/30; B62M 9/02; B62M 11/02; F16D 41/24
USPC ....................................................... 280/210
See application file for complete search history.

(56) References Cited

U.S. PATENT DOCUMENTS

| | | | | |
|---|---|---|---|---|
| 1,967,141 | A * | 7/1934 | Basso ...................... | B62M 1/00 475/182 |
| 3,323,812 | A * | 6/1967 | Tung ........................ | B62M 1/30 280/258 |
| 4,019,230 | A | 4/1977 | Pollard | |
| 4,029,334 | A | 6/1977 | Trammell, Jr. | |
| 4,560,182 | A * | 12/1985 | Yamaguchi .............. | B62M 1/36 280/257 |
| 4,772,252 | A | 9/1988 | Bóna | |
| 4,816,009 | A | 3/1989 | Philipp | |
| 5,419,572 | A | 5/1995 | Stiller et al. | |
| 5,662,346 | A | 9/1997 | Toronto et al. | |
| 5,716,069 | A | 2/1998 | Bezerra et al. | |
| 5,860,329 | A | 1/1999 | Day | |
| 6,516,685 | B2 * | 2/2003 | Wang ....................... | B62M 1/30 280/261 |
| 8,220,814 | B1 | 7/2012 | Riviglia et al. | |

(Continued)

*Primary Examiner* — Jacob D Knutson
(74) *Attorney, Agent, or Firm* — The Webb Law Firm

(57) ABSTRACT

A bicycle drivetrain including a first shaft and a second shaft which rotate in opposing directions, a first pedal connected to a first pedal crank connected to the first shaft and a second pedal connected to a second pedal crank connected to a second shaft, an engaged first spur gear and second spur gear attached to the first shaft and the second shaft, respectively, a first slip clutch mounted to the first shaft and connected to a main sprocket and a second slip clutch mounted to the second shaft, a first sprocket and a second sprocket having the same direction of rotation and attached to the first slip clutch and the second slip clutch, respectively, a rear sprocket attached to a rear wheel and connected to the main sprocket, and a plurality of mechanical stops which prevent unwanted rotation of the bicycle drivetrain.

17 Claims, 7 Drawing Sheets

(56) References Cited

U.S. PATENT DOCUMENTS

| | | |
|---|---|---|
| 8,517,405 B2 | 8/2013 | Yan |
| 2008/0088111 A1 | 4/2008 | Wei |
| 2009/0278330 A1 | 11/2009 | Hartmann |
| 2010/0096826 A1 | 4/2010 | Baek et al. |
| 2017/0137086 A1* | 5/2017 | Yamamoto ............... B62M 6/45 |
| 2017/0217537 A1* | 8/2017 | Yamamoto ............... B62M 6/50 |

* cited by examiner

VIEW A-A

BICYCLE DRIVETRAIN

CROSS REFERENCE TO RELATED APPLICATIONS

This application claims the benefit of priority from U.S. Provisional Patent Application No. 62/600,419, entitled "Top Dead Center Avoider," filed Feb. 22, 2017, the entire contents of which are incorporated herein by reference.

BACKGROUND OF THE INVENTION

Field of the Invention

The present invention is directed to a bicycle drivetrain and, in particular, a bicycle drivetrain to assist in preventing the rider from pedaling into inefficient positions.

Description of Related Art

To minimize exertion and increase overall efficiency, various drivetrains have been invented for the bicyclist. One such device is the derailleur. Derailleurs "shift gears" by moving a chain from one pair of circular sprockets to another pair of circular sprockets. Another device is the oval front sprocket. The oval front sprocket is meant to be an improvement over the circular front sprocket, as it can achieve greater leverage than the circular front sprocket at certain angular positions of the pedal cranks.

In both derailleurs and oval sprocket devices, the crank arms are rotated a full 360 degrees per pedaling cycle. Consequently, in both cases the pedals must pass through a "top dead center" zone, where the pedal cranks are vertical. Considering only a downward pedal stroke, the vertical force required to rotate the sprocket while in the "top dead center" zone would be enormous. In such circumstances, the bicyclist must provide a horizontal force by pushing the pedal forward. This horizontal force is provided primarily by the weaker leg muscles due to the position of the bicyclist sitting directly above the front sprocket. Thus, it is difficult to create a large force in this direction.

When pedaling near the "top dead center" zone, the bicyclist is not able to exert his full potential to propel the bicycle.

Bicyclists using either the derailleurs or the oval sprocket devices share the same problems with the "top dead center" zones. Furthermore, other drivetrains have been invented with reciprocating pedals that allow for a 180 degree rotation per pedaling cycle instead of the full 360 degrees per pedaling cycle. However, these devices require the rider to put their legs in awkward and uncomfortable positions. Also, they do not have a mechanism in place to prevent the pedals from reaching or effectively minimizing the problems associated with the "top dead center" zone. A device is needed that can avoid the "top dead center" zone completely.

By creating such a device, the bicycling experience will be improved and further promote the use of bicycles. Furthermore, a bicycle drivetrain that prevents the pedals from reaching the "top dead center" and "bottom dead center" zones would make it easier for physically challenged people to ride a bicycle, as well as, the riding of bicycles in physically demanding environments, such as up steep hills. Such a device would decrease the strain of riding bicycles in such conditions and increase the performance of bicycles by allowing the rider to apply more of the power available to them in a more efficient manner. Further, permitting pedaling while the pedal cranks are closer to horizontal, would allow a bicyclist to apply much more power to their pedaling stroke.

SUMMARY OF THE INVENTION

An embodiment of a bicycle drivetrain may include a first shaft and a second shaft extending through a bicycle frame of a bicycle, wherein the first shaft and the second shaft are configured to rotate simultaneously in opposing directions. The bicycle drivetrain may also include a first pedal connected to a first pedal crank connected to the first shaft and a second pedal connected to a second pedal crank connected to the second shaft, wherein the first pedal crank and the second pedal crank are located on opposite sides of the bicycle frame. Further, a first spur gear is attached to the first shaft and a second spur gear is attached to the second shaft, wherein the first spur gear and the second spur gear are engaged with each other such that the first spur gear, the first shaft, and the first pedal crank are configured to rotate in the opposite direction of the second spur gear, the second shaft, and the second pedal crank. A first slip clutch may also be mounted to the first shaft and connected to a main sprocket so that rotating the first shaft clockwise will rotate the main sprocket clockwise, and a second slip clutch may be mounted on the second shaft. A first sprocket can be attached to the first slip clutch and a second sprocket can be attached to the second slip clutch, wherein the first sprocket and the second sprocket are engaged with a sprocket chain so that both the first sprocket and the second sprocket have the same direction of rotation. A rear sprocket can be configured to be attached to a rear wheel, wherein the rear sprocket is connected to the main sprocket via a chain so that when the main sprocket is rotated, the rear sprocket is configured to rotate and propel the bicycle forward. A plurality of mechanical stops may also be utilized wherein a first mechanical stop can be attached to the first pedal crank, a second mechanical stop can be attached to and extend away from the bicycle frame, and a third mechanical stop can be attached to and extend away from the bicycle frame. The first mechanical stop, the second mechanical stop, and the third mechanical stop are configured to prevent further rotation of the first spur gear and the first pedal crank and the second spur gear and the second pedal crank from reaching positions that are too far above the first shaft and too far below the second shaft, respectively, and are too near the "top dead center" and "bottom dead center" zones.

In one embodiment of a bicycle drivetrain the first mechanical stop comes into contact with the second mechanical stop and prevents rotation of the first spur gear and the second spur gear and prevents the first pedal crank and the second pedal crank from reaching positions placing the angle between the first pedal crank and the second pedal crank at or close to 180 degrees. Further, the second pedal crank comes into contact with the third mechanical stop and prevents rotation of the first spur gear and the second spur gear and prevents the first pedal crank and the second pedal crank from reaching positions placing the angle between the first pedal crank and the second pedal crank at or close to 180 degrees.

In another embodiment of a bicycle drivetrain the first mechanical stop comes into contact with the second mechanical stop and prevents rotation of the first spur gear and the second spur gear and prevents the first pedal crank and the second pedal crank from reaching positions placing the angle between the first pedal crank and the second pedal crank at or close to 90 degrees. Further, the second pedal crank comes into contact with the third mechanical stop and prevents rotation of the first spur gear and the second spur gear and prevents the first pedal crank and the second pedal crank from reaching positions placing the angle between the first pedal crank and the second pedal crank at or close to 90 degrees.

In another embodiment of a bicycle drivetrain, the mechanical stops can be placed at other positions to shorten the rotation of the first pedal crank and the second pedal crank to decrease pedal distance for the rider.

In one embodiment of a bicycle drivetrain, the first mechanical stop attached to the first pedal crank rotates with the first pedal crank, when the bicycle drivetrain is actuated. Further, the second mechanical stop, which is stationary and extends away from the bicycle frame, is located on the same rotational path of the first mechanical stop. Therefore, once the first pedal crank has rotated enough, the first mechanical stop comes into contact with the second mechanical stop, thereby, preventing further rotation of the first mechanical stop and the first pedal crank and only allowing the first pedal crank to begin rotation in the opposite direction. Furthermore, the third mechanical stop, which is stationary and extends away from the bicycle frame, is located on the same rotation path of the second pedal crank. Therefore, once the second pedal crank has rotated enough, the second pedal crank comes into contact with the third mechanical stop, thereby, preventing further rotation of the second pedal crank and only allowing the second pedal crank to begin rotation in the opposite direction.

In one embodiment of a bicycle drivetrain, the first slip clutch can slip clockwise with respect to the first shaft, but if the first slip clutch rotates counter-clockwise with respect to the first shaft, then the first slip clutch will prevent the first shaft from slipping. Further, the second slip clutch can slip clockwise with respect to the second shaft, but if the second slip clutch rotates counter-clockwise with respect to the second shaft, then the second shaft will slip.

In another embodiment of a bicycle drivetrain, the first spur gear has a smaller diameter than the second spur gear and the first pedal crank is shorter than the second pedal crank. Further, the ratio of the diameter of the first spur gear to the diameter of the second spur gear is equal to the ratio of the length of the first pedal crank to the length of the second pedal crank.

Further, the first sprocket may have a smaller diameter than the second sprocket and the ratio of the diameter of the first sprocket to the diameter of the second sprocket is equal to the ratio of the length of the first pedal crank to the length of the second pedal crank.

In one embodiment of a bicycle drivetrain, the first pedal crank rotates about an axis that is in front of the axis that the second pedal crank rotates about. Furthermore, when the angle between the first pedal crank and the second pedal crank is small enough, the arcuate paths of the first pedal and the second pedal are similar.

In another embodiment of a bicycle drivetrain, a first pedal shaft connects a first pedal to the first pedal crank and a second pedal shaft connects the second pedal to the second pedal crank, wherein the first pedal shaft can freely rotate within the first pedal crank and the second pedal shaft can freely rotate within the second pedal crank.

In another embodiment of a bicycle drivetrain, the bicycle drivetrain further includes a housing secured to the bicycle frame, wherein the housing is configured to house and protect the various components of the bicycle drivetrain.

In another embodiment of a bicycle drivetrain, the main sprocket may be oval in shape rather than circular. In another embodiment, a derailleur may be incorporated into the bicycle drivetrain.

In another embodiment of a bicycle drivetrain, the first pedal and the second pedal do not contain any strap or any other methods of attaching a rider's feet to the first pedal and the second pedal. In another embodiment, the first pedal and the second pedal are the same distance outboard from the bicycle frame.

In another embodiment of a bicycle drivetrain, rotating the first shaft clockwise will rotate the second spur gear and the second shaft counter-clockwise, thereby, raising the second pedal.

Another embodiment of a bicycle drivetrain may include a first shaft and a second shaft configured to rotate simultaneously in opposing directions; a first pedal connected to a first pedal crank connected to the first shaft and a second pedal connected to a second pedal crank connected to a second shaft; wherein the first pedal and the first pedal crank are configured to rotate simultaneously in opposing directions to the second pedal and the second pedal crank, the first pedal and the first pedal crank are configured to rotate between a predetermined top position such that the first pedal crank is not permitted to reach a completely vertical position above the first shaft and a predetermined bottom position such that the first pedal crank is not permitted to reach a completely vertical position below the first shaft, and the second pedal and the second pedal crank are configured to rotate between a predetermined top position such that the second pedal crank is not permitted to reach a completely vertical position above the second shaft and a predetermined bottom position such that the second pedal crank is not permitted to reach a completely vertical position below the second shaft.

A method of propelling a bicycle may include providing a bicycle with a bicycle drivetrain including a first shaft and a second shaft configured to rotate simultaneously in opposing directions, a first pedal connected to a first pedal crank connected to the first shaft and a second pedal connected to a second pedal crank connected to a second shaft, a first spur gear attached to the first shaft and a second spur gear attached to the second shaft, wherein the first spur gear and the second spur gear are engaged, a first slip clutch mounted to the first shaft and connected to a main sprocket and a second slip clutch mounted to the second shaft, a first sprocket attached to the first slip clutch and a second sprocket attached to the second slip clutch, wherein the first sprocket and second sprocket have the same direction of rotation, and a rear sprocket attached to a rear wheel and connected to the main sprocket via a chain; and applying force to the first pedal in a direction causing the first shaft and the first spur gear to rotate in one direction while the second shaft and the second spur gear rotate in the other direction, and further causing the main sprocket to rotate, thereby, rotating the rear sprocket and rear wheel, propelling the bicycle forward.

Another embodiment of a method may include applying force to a first pedal of the bicycle in a direction causing a first shaft and a first spur gear to rotate in one direction while a second shaft and a second spur gear rotate in an opposite direction, and further causing a main sprocket of the bicycle to rotate, thereby, rotating a rear sprocket and a rear wheel of the bicycle, propelling the bicycle forward; mechanically preventing the first pedal shaft and the first spur gear from rotating beyond a point wherein the first pedal is positioned a predetermined distance above the first pedal shaft; and mechanically preventing the second shaft and the second spur gear from rotating beyond a point wherein a second pedal is positioned a predetermined distance below the second shaft. The method may include reversing the direction of rotation of the first shaft and first spur gear; reversing the direction of rotation of the second shaft and second spur gear; mechanically preventing the first pedal shaft and first spur gear from rotating beyond a point wherein the first pedal is positioned a predetermined distance below the first pedal shaft; and mechanically preventing the second shaft and the second spur gear from rotating beyond a point wherein a second pedal is positioned a predetermined distance above the second shaft. The method may also include providing a plurality of mechanical stops to prevent the first pedal shaft, second pedal shaft, first pedal, and second pedal from rotating beyond a point in one direction.

DETAILED DESCRIPTION

Figure 1:
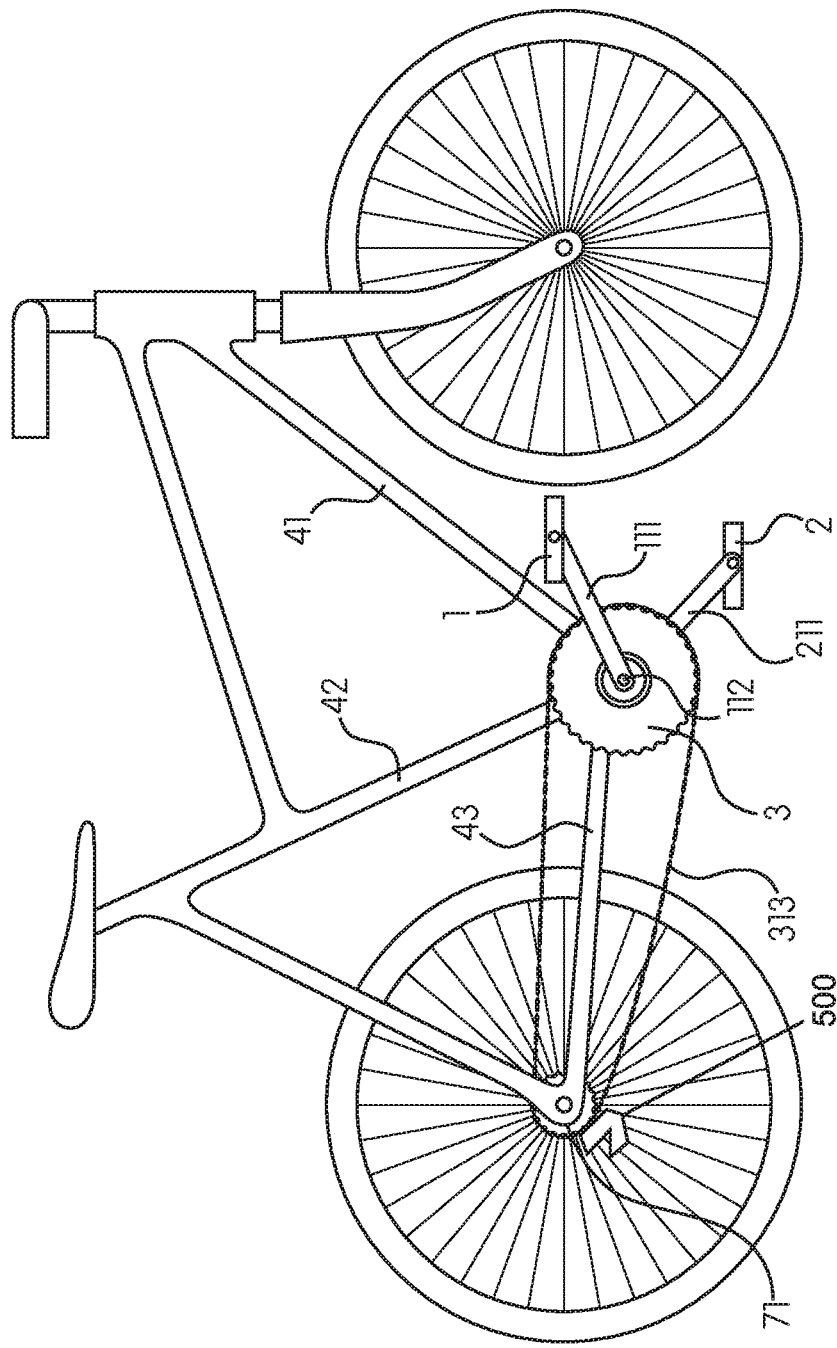
FIG. 1 is a right hand side view of a bicycle equipped with an embodiment of a bicycle drivetrain.

For purposes of the description hereinafter, the terms "end", "upper", "lower", "right", "left", "vertical", "horizontal", "top", "bottom", "lateral", "longitudinal", "upward", "downward", "forward", "rear", and derivatives thereof shall relate to the invention as it is oriented in the drawing figures. However, it is to be understood that the invention may assume various alternative variations, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
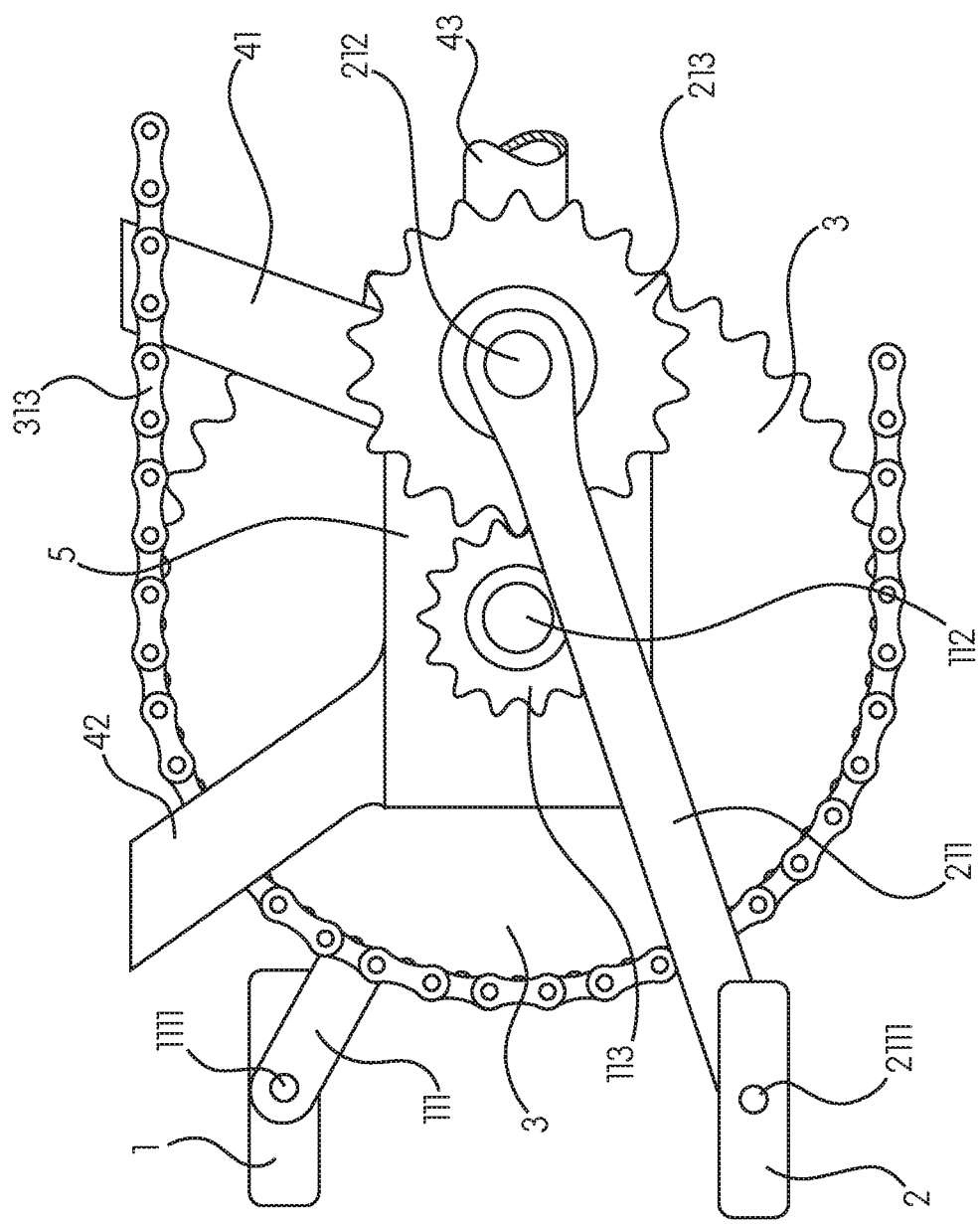
FIG. 2 is a left hand side view of the bicycle drivetrain of FIG. 1.
Figure 3:
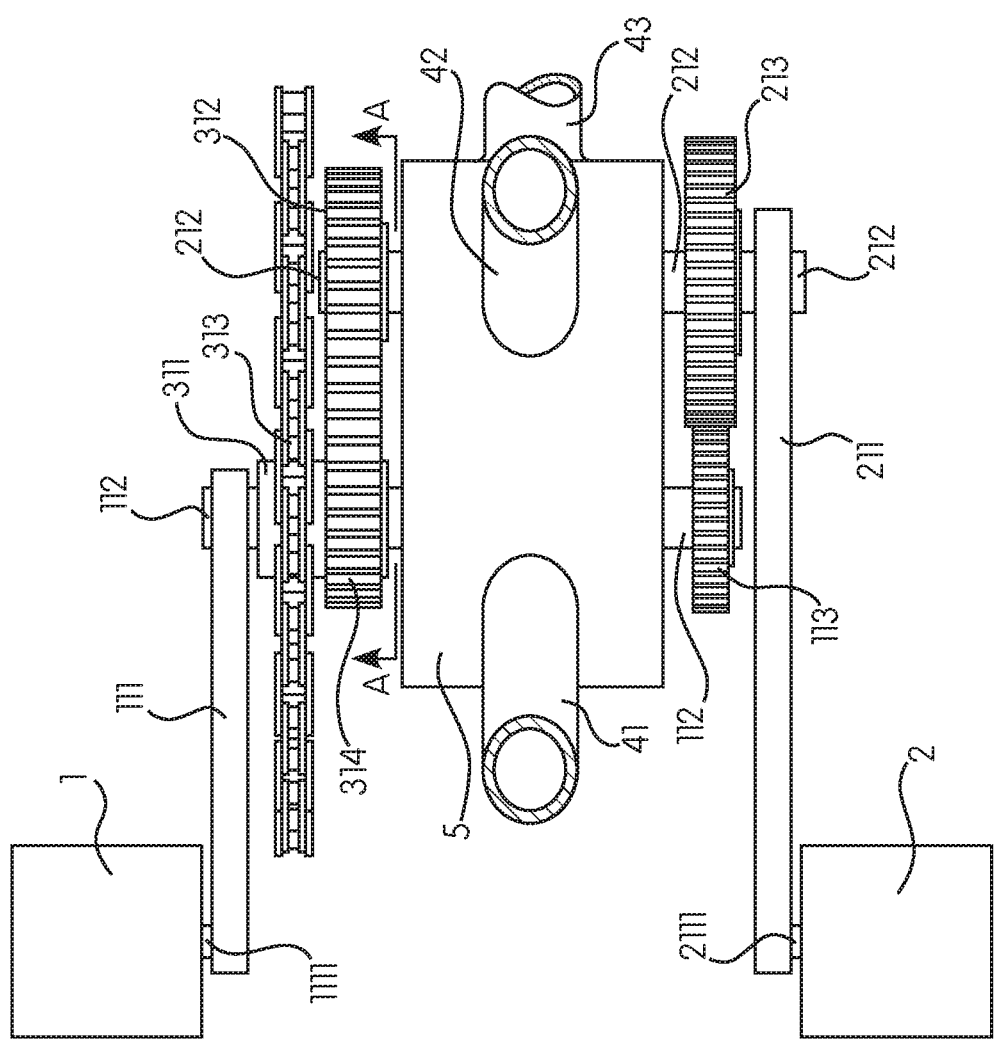
FIG. 3 is a top view of the bicycle drivetrain of FIG. 1.

Referring now to FIGS. 1-3, a bicycle and a bicycle drivetrain, according to the present invention, may include a first pedal 1, connected to a first pedal crank 111, which is further connected to a first drivetrain shaft 112. A second pedal 2 is connected to a second pedal crank 211 which is further connected to a second drivetrain shaft 212. The first drivetrain shaft 112 and the second drivetrain shaft 212 extend through the bicycle frame. Also included are a first frame member 41, second frame member 42, and third frame member 43. The first pedal crank 111 and the second pedal crank 211 are located on the opposite sides of the bicycle frame. The first drivetrain shaft 112 and the second drivetrain shaft 212 are configured to rotate simultaneously in opposing directions.

In one embodiment, first pedal 1 can be rigidly connected to a first pedal shaft 1111. The second pedal 2 can also be rigidly connected to the second pedal shaft 2111. The first pedal shaft 1111 and the second pedal shaft 2111 can then be free to rotate within the first pedal crank 111 and the second pedal crank 211, respectively. In this embodiment, the first pedal crank 111 can be rigidly attached to the first drivetrain shaft 112 and the second pedal crank 211 can be rigidly attached to the second drivetrain shaft 212.

In another embodiment, the bicycle drivetrain can include a housing 5, which is supported by the first frame member 41, the second frame member 42, and the third frame member 43 of the bicycle frame. The housing 5 is configured to house and protect the various components of the bicycle drive train, including the first shaft 112 and the second shaft 212, which are free to rotate within housing 5.

A first slip clutch 311 is mounted on the first shaft 112. The first slip clutch 311 is also attached to the main sprocket 3. The first slip clutch 311 can slip clockwise with respect to the first shaft 112. However, if the first slip clutch 311 should rotate counter-clockwise with respect to the first shaft 112, the first slip clutch 311 will prevent the first shaft 112 from slipping. The first slip clutch 311 is mounted onto the first shaft 112 and connected to the main sprocket 3, in such a way that rotating the first pedal crank 111, the first shaft 112, and the first slip clutch 311 clockwise will also rotate the main sprocket 3 clockwise.

A first spur gear 113 is attached to the first shaft 112 and a second spur gear 213 is attached to the second shaft 212. The first spur gear 113 and the second spur gear 213 are engaged or meshed with each other such that the first spur gear 113, the first shaft 112, and the first pedal crank 111 are configured to rotate in the opposite direction of the second spur gear 213, the second shaft 212, and the second pedal crank 211. For example, rotating first shaft 112 clockwise will rotate second spur gear 213 and the second shaft 212 counter-clockwise. This will also rotate the second shaft 212 and the second pedal crank 211 counter-clockwise, thereby, raising the pedal 2.

A second slip clutch 312 is mounted onto the second shaft 212. The second slip clutch 312 can slip clockwise with respect to the second shaft 212. However, if the second slip clutch 312 rotates counter-clockwise, then the second slip clutch 312 will let the second shaft 212 slip.

A rear sprocket 71 can be configured to be attached to a rear wheel as seen in FIG. 1. The rear sprocket 71 is connected to the main sprocket 3 by a chain 313 so that when the main sprocket 3 is rotated, the rear sprocket 71 rotates causing the rear wheel to rotate and propel the bicycle forward.

Figure 4:
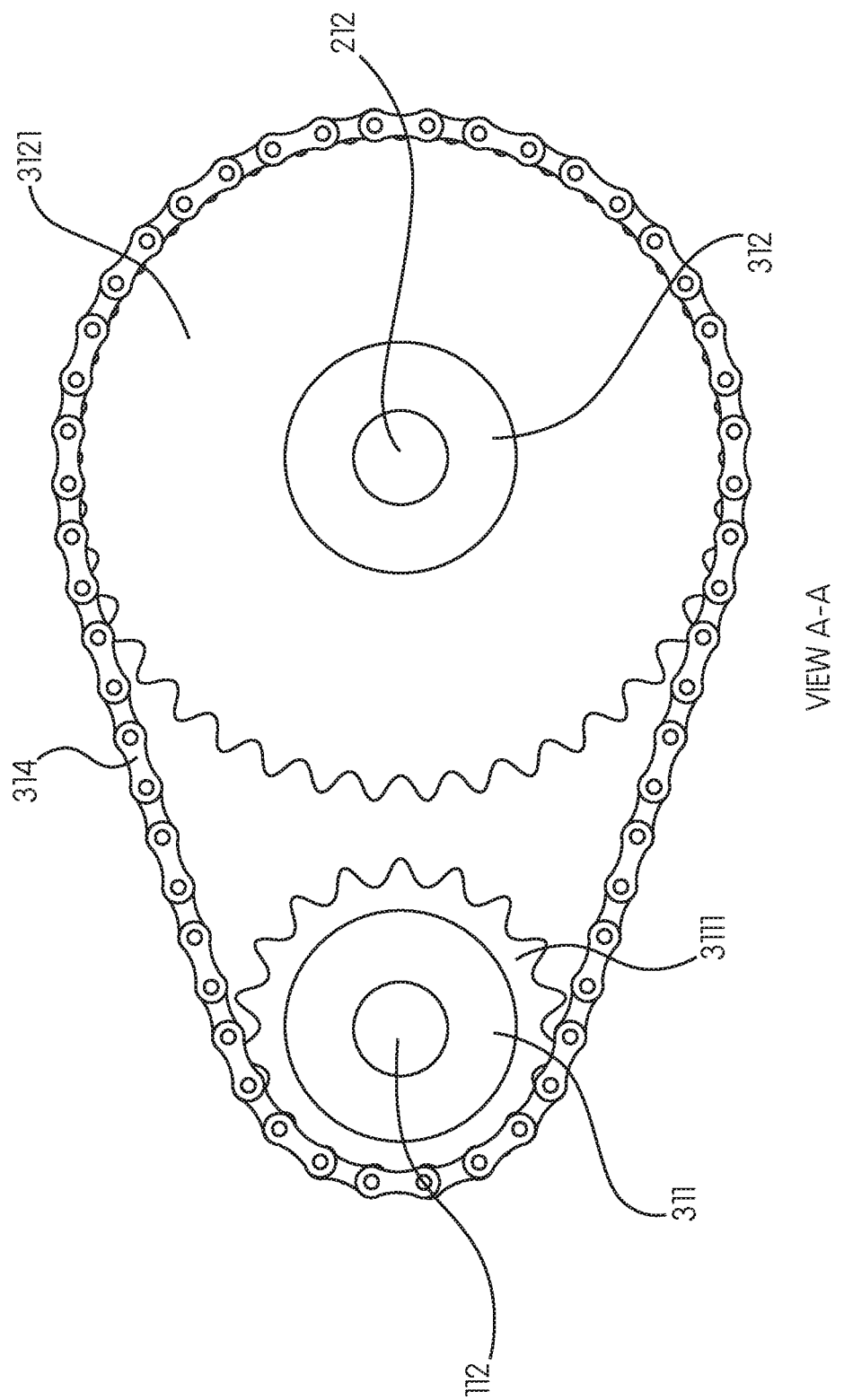
FIG. 4 is a side view of the first and second sprocket and one of the two sprocket chains of the bicycle drivetrain of FIG. 1.

Referring to FIG. 4, a first sprocket 3111 is attached to the first slip clutch 311 and a second sprocket 3121 is attached to a second slip clutch 312. The first sprocket 3111 and the second sprocket 3121 are engaged with a sprocket chain 314 so that the first sprocket 3111 and the second sprocket 3121 have the same direction of rotation.

In one embodiment, the first spur gear 113 can have a smaller diameter than the second spur gear 213, and the first pedal crank 111 can be shorter than the second pedal crank 211. In such an embodiment, the ratio of the diameter of the first spur gear 113 to the diameter of the second spur gear 213 is equal to the ratio of the length of the first pedal crank 111 to the length of the second pedal crank 211. Furthermore, the first sprocket 3111 can have a smaller diameter than the second sprocket 3121, whereby, the ratio of the diameter of the first sprocket 3111 to the diameter of the second sprocket 3121 is equal to the ratio of the length of the first pedal crank 111 to the length of the second pedal crank 211.

Figure 5:
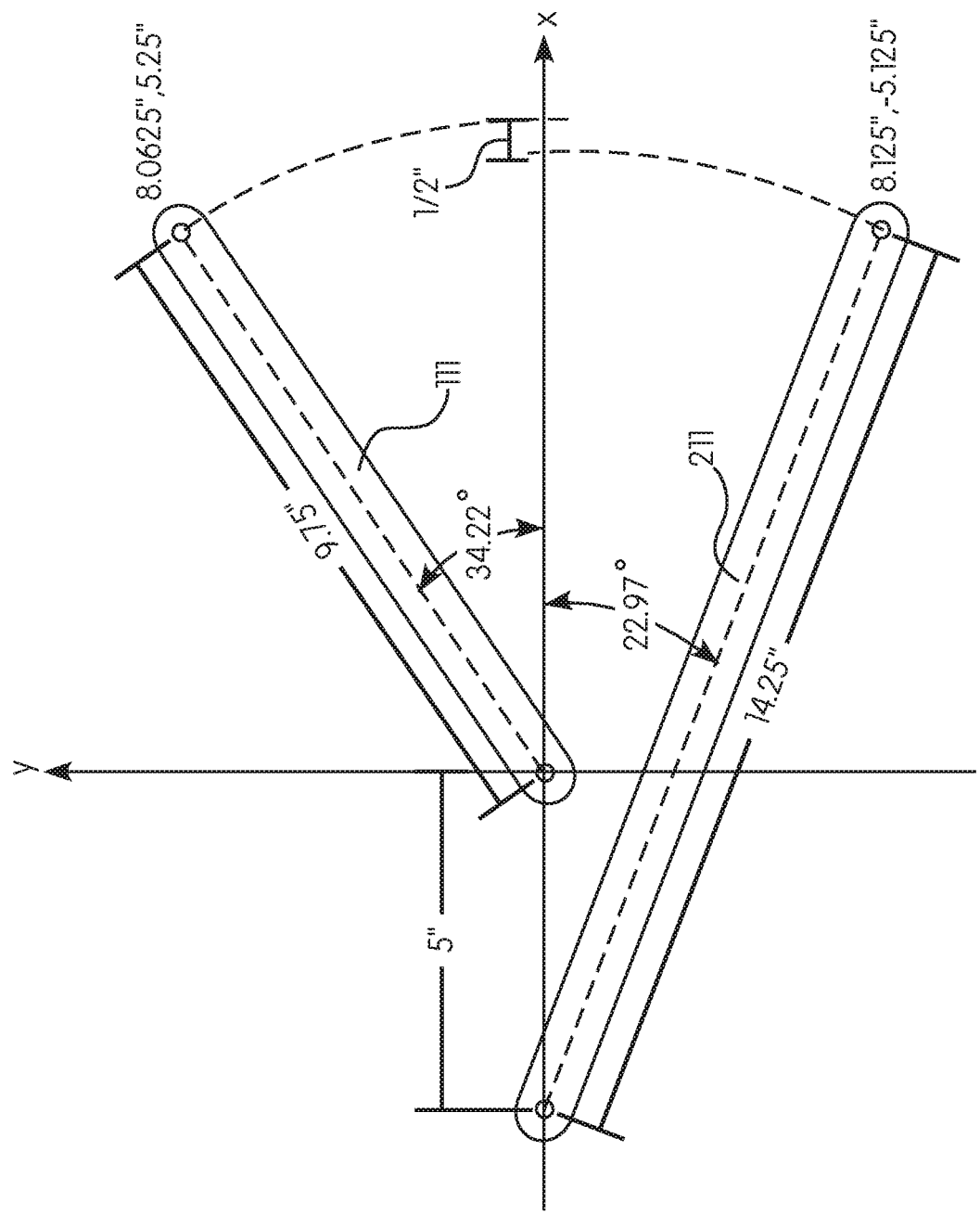
FIG. 5 is a schematic view of exemplary angular positions of the first and second pedal cranks of the bicycle drivetrain of FIG. 1.

Now referring to FIG. 5, the first pedal crank 111 can rotate about an axis that is in front of the axis that the second pedal crank 211 rotates about. This can occur as the lengths of the first pedal crank 111 and the second pedal crank 211 are different. However, to minimize the discrepancy between the paths of rotation for the first pedal crank 111 and the second pedal crank 211, the lengths of the first pedal crank 111 and the second pedal crank 211 and the distance that separates the first shaft 112 and the second shaft 212 can be specially designed. Furthermore, the angle between the first pedal crank 111 and the second pedal crank 211 is small enough that the arcuate paths of the first pedal 1 and the second pedal 2 are similar and the bicyclist would not notice the difference in the lengths of the first pedal crank 111 and the second pedal crank 211, as well as, the paths on which they rotate.

Figure 6:
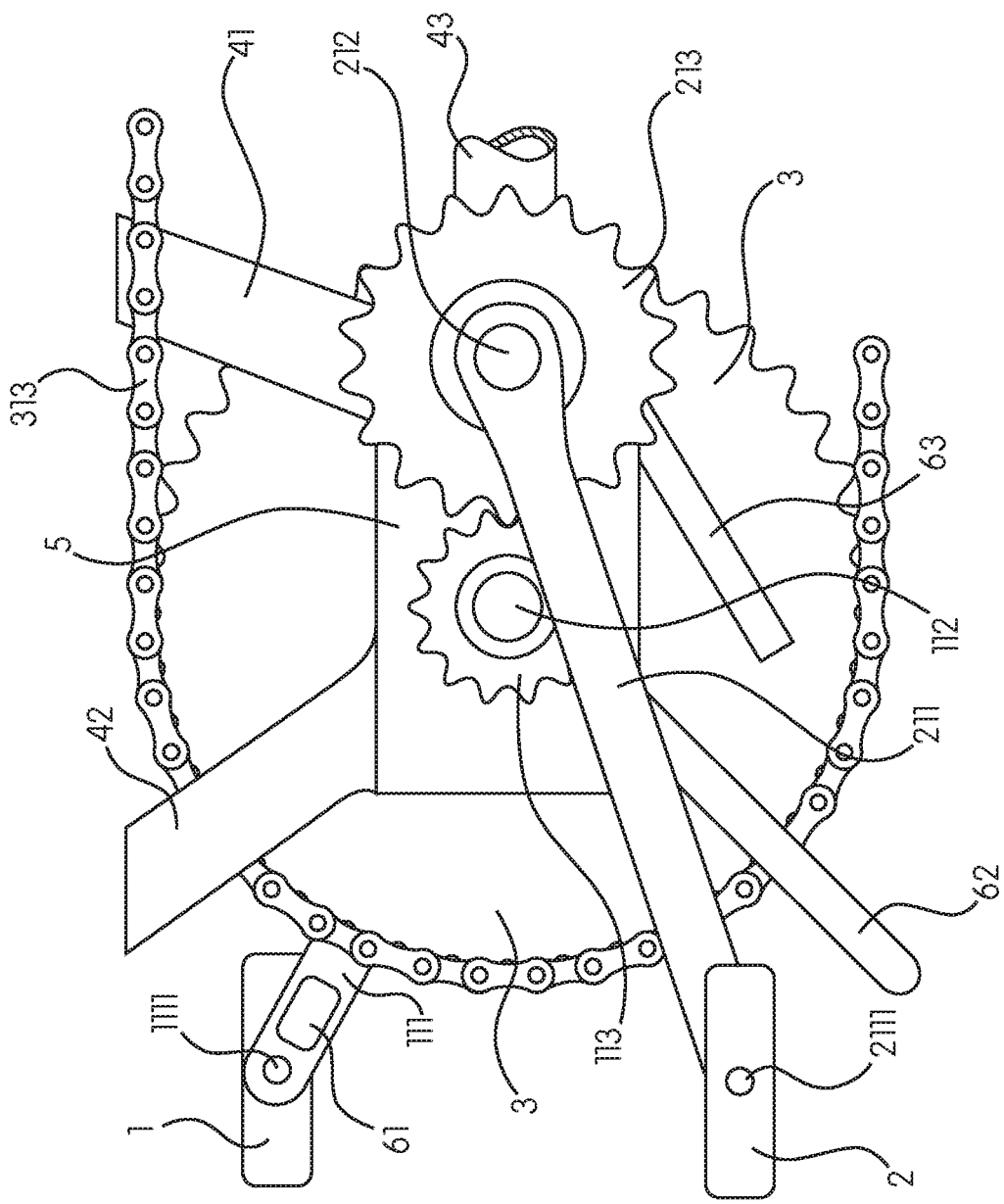
FIG. 6 is a left hand side view of an embodiment of the bicycle drivetrain of FIG. 1 with mechanical stops.
Figure 7:
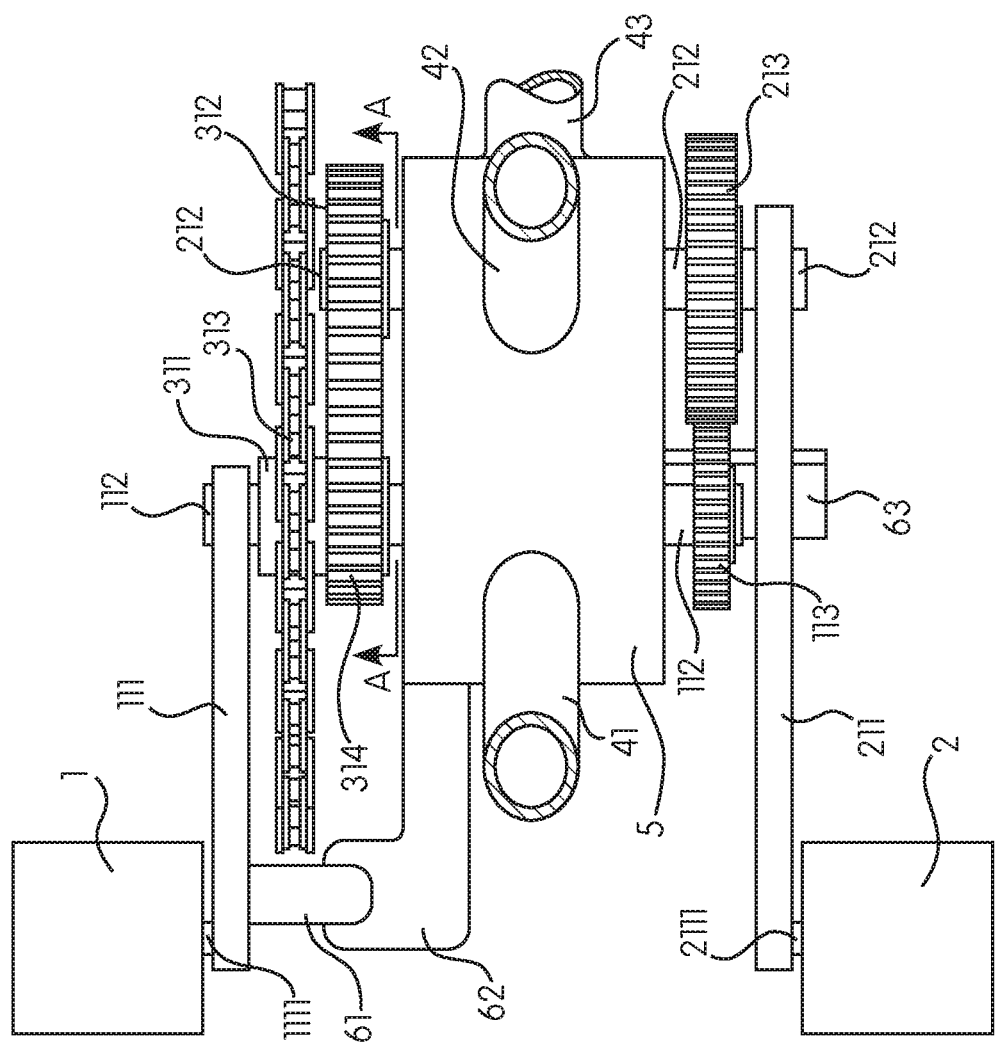
FIG. 7 is a top view of the bicycle drivetrain of FIG. 6.

Now referring to FIGS. 6 and 7, the bicycle drivetrain can also include a plurality of mechanical stops configured to prevent further rotation of the first pedal crank 111 and the second pedal crank 211. In a preferred embodiment, the bicycle drivetrain would include a first mechanical stop 61, a second mechanical stop 62, and a third mechanical stop 63. The first mechanical stop 61 can be attached to the first pedal crank 111. The second mechanical stop 62 can be attached to and extend away from the bicycle frame or housing 5. The third mechanical stop 63 can be attached to and extend away from the bicycle frame or housing 5. The first mechanical stop 61, the second mechanical stop 62, and the third mechanical stop 63 would be configured and placed to prevent further rotation of the first spur gear 113 and the first pedal crank 111 and the second spur gear 213 and the second pedal crank 211. The stops prevent the first pedal 1 and the second pedal 2 from reaching positions that are too far above the first shaft 112 and the second shaft 212.

In one such embodiment, the first mechanical stop 61 would come into contact with the second mechanical stop 62 and prevent the first spur gear 113, the first pedal crank 111, the second spur gear 213 and the second pedal crank 211 from reaching positions placing the angle between the first pedal crank 111 and the second pedal crank 211 at or close to 180 degrees. The second pedal crank 211 would also come into contact with the third mechanical stop 63 and prevent the first spur gear 113, the first pedal crank 111, the second spur gear 213 and the second pedal crank 211 from reaching positions placing the angle between the first pedal crank 111 and the second pedal crank 211 at or close to 180 degrees. This arrangement would prevent the first pedal crank 111 and the second pedal crank 211, as well as the first pedal 1 and the second pedal 2, from approaching the "top dead center" zone and the "bottom dead center" zone or allowing the rider to pedal in regions that are behind the main sprocket 3.

In another embodiment, to ensure that the first pedal 1 and the second pedal 2 avoid the "top dead center" and "bottom dead center" zones and remain forward of the first shaft 112, the first mechanical stop 61, the second mechanical stop 62, and the third mechanical stop 63 can be placed in positions that prevent the first pedal crank 111 and the second pedal crank 211 from reaching positions placing the angle between the first pedal crank 111 and the second pedal crank 211 at 90 degrees. The mechanical stops can be placed at other positions to further shorten the rotation of the first pedal crank 111 and the second pedal crank 211 to decrease pedal distance for the rider.

When the rider feels that the feedback force from the pedals is increasing, the rider will take shorter strokes, and when the feedback force is diminishing, the rider will take longer strokes. When the said feedback force gets very large, the rider can rise up from the bicycle seat, if necessary, to further increase the downward force on a pedal.

These embodiments allow a rider or bicyclist to employ frequent downward pedal strokes that are short, thereby, allowing less frequent pedal strokes that are long. This allows the rider to utilize more powerful strokes and expend less energy while bicycling, thereby, increasing performance of the bicycle and decreasing the strain of bicycling.

In one embodiment, the main sprocket 3 may be oval in shape rather than circular, so as to improve the main sprocket 3 as greater leverage can be achieved at certain angular positions of the first pedal crank 111 and the second pedal crank 211.

In another embodiment, a derailleur 500 may be incorporated into the bicycle drivetrain allowing a sprocket chain 314 to move between the first sprocket 3111 and the second sprocket 3121 to another set of circular sprockets, thereby, allowing the bicyclist to "shift gears."

In one embodiment, the first pedal 1 and the second pedal 2 do not contain any strap or other methods of attaching a rider's feet to the first pedal 1 and the second pedal 2. This embodiment can be utilized so that the rider's feet are not trapped in a pedal and, therefore, the rider is safe with their feet free from such entanglements. In another embodiment, the first pedal 1 and the second pedal 2 are the same distance outboard from the bicycle frame or housing 5.

A method of using the bicycle with a bicycle drivetrain as described above would be to apply force to the first pedal 1 in a downward direction causing the first shaft 112 and the first spur gear 113 to rotate in one direction while the second shaft 212 and the second spur gear 213 rotate in the other direction, and also causing the main sprocket 3 to rotate the rear sprocket 71 and the rear wheel, propelling the bicycle forward. This method may also provide a plurality of mechanical stops as described above to prevent the bicyclist or rider from pedaling in the "top dead center" and "bottom dead center" zones and allowing pedaling only in zones where the pedal distance is further decreased.

In one example, the first pedal 1 can be pushed downward to deliver a power stroke for the rider or bicyclist. When the first pedal 1 moves downward, the first pedal crank 111, the first shaft 112, the first sprocket 3111, the first slip clutch 311, and the main sprocket 3 all turn clockwise, when viewing the drivetrain or bicycle as shown in FIG. 1 or FIG. 5. As the main sprocket 3 turns clockwise, the chain 313 moves causing the rear sprocket 71 to also turn clockwise, thereby, turning the rear wheel and propelling the bicycle forward. Furthermore, the first spur gear 113 rotates clockwise as it is attached to the first shaft 112. The engaged second spur gear 213 then rotates counter-clockwise, thereby, causing the second shaft 212 and the second pedal crank 211 to rotate counter-clockwise, thereby, forcing the second pedal 2 to move upward and preparing the second pedal 2 to be pushed downward by the rider or bicyclist for another power stroke. The second slip clutch 312 allows the second shaft 212 to slip counter-clockwise while the second slip clutch 312 allows the second sprocket 3121 to rotate clockwise with the first sprocket 3111.

Once the second pedal 2 is pushed downward by the rider, the second pedal crank 211, the second spur gear 213, and the second shaft 212 turn clockwise. The first spur gear 113 turns counter-clockwise because the second spur gear 213 and the first spur gear 113 are meshed. The first spur gear 113 turning counter-clockwise causes the first shaft 112 to also rotate counter-clockwise, but does not turn the first slip clutch 311. The first shaft 112 rotates the first pedal crank 111 counter-clockwise, thereby, raising the first pedal 1 to complete the cycle. The second shaft 212 also turns the second slip clutch 312 clockwise, thereby, moving the sprocket chain 314 and rotating the first slip clutch 311 and the main sprocket 3 clockwise. When the main sprocket 3 rotates clockwise, the main sprocket 3 moves the chain 313 and rotates the rear sprocket 71 clockwise, thereby, turning the rear wheel and propelling the bicycle forward. During this process the first shaft 112 slips counter-clockwise with respect to the clockwise rotation of the first slip clutch 311.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A bicycle drivetrain, comprising:
   a first shaft and a second shaft extending through a bicycle frame of a bicycle, wherein the first shaft and the second shaft are configured to rotate simultaneously in opposing directions;
   a first pedal connected to a first pedal crank which is connected to the first shaft and a second pedal connected to a second pedal crank which is connected to the second shaft, wherein the first pedal crank and the second pedal crank are located on opposite sides of the bicycle frame;
   a first spur gear attached to the first shaft and a second spur gear attached to the second shaft, wherein the first spur gear and the second spur gear are engaged with each other such that the first spur gear, the first shaft, and the first pedal crank are configured to rotate in the opposite direction of the second spur gear, the second shaft, and the second pedal crank;
   a first slip clutch mounted to the first shaft and connected to a main sprocket so that rotating the first shaft clockwise will rotate the main sprocket clockwise;
   a second slip clutch mounted on the second shaft;
   a first sprocket attached to the first slip clutch and a second sprocket attached to the second slip clutch, wherein the first sprocket and the second sprocket are engaged with a sprocket chain so that the first sprocket and the second sprocket have the same direction of rotation;
   a rear sprocket configured to be attached to a rear wheel, wherein the rear sprocket is connected to the main sprocket via a chain so that when the main sprocket is rotated, the rear sprocket is configured to rotate and propel the bicycle forward;
   a first mechanical stop attached to the first pedal crank;
   a second mechanical stop attached to and extending away from the bicycle frame; and
   a third mechanical stop attached to and extending away from the bicycle frame,
   wherein the first mechanical stop, the second mechanical stop, and the third mechanical stop are configured to prevent further rotation of the first spur gear and the first pedal crank and the second spur gear and the second pedal crank, wherein the first pedal and the second pedal are prevented from reaching positions above the first shaft a predetermined distance and below the second shaft a predetermined distance.

2. The bicycle drivetrain of claim 1, wherein the first mechanical stop comes into contact with the second mechanical stop and prevents rotation of the first spur gear and the second spur gear and prevents the first pedal crank and the second pedal crank from reaching positions placing an angle between the first pedal crank and the second pedal crank at or close to 180 degrees,
   wherein the second pedal crank comes into contact with the third mechanical stop and prevents rotation of the first spur gear and the second spur gear and prevents the first pedal crank and the second pedal crank from reaching positions placing the angle between the first pedal crank and the second pedal crank at or close to 180 degrees.

3. The bicycle drivetrain of claim 1, wherein the first mechanical stop interacts with the second mechanical stop and prevents further rotation of the first spur gear and the second spur gear and prevents the first pedal crank and the second pedal crank from reaching positions placing an angle between the first pedal crank and the second pedal crank at 90 degrees,
   wherein the second pedal crank interacts with the third mechanical stop and prevents further rotation of the first spur gear and the second spur gear and prevents the first pedal crank and the second pedal crank from reaching positions placing the angle between the first pedal crank and the second pedal crank at 90 degrees.

4. The bicycle drivetrain of claim 1, wherein the first, second, and third mechanical stops are configured to shorten the rotation of the first pedal crank and the second pedal crank to decrease pedal distance for a rider.

5. The bicycle drivetrain of claim 1, wherein the first mechanical stop attached to the first pedal crank rotates with the first pedal crank, when the bicycle drivetrain is actuated, and the second mechanical stop, which is stationary and extends away from the bicycle frame, is located on a same rotational path of the first mechanical stop, wherein once the first pedal crank has rotated enough, the first mechanical stop comes into contact with the second mechanical stop, thereby, preventing further rotation of the first mechanical stop and the first pedal crank and forcing the first pedal crank to begin rotation in the opposite direction,
   further wherein the third mechanical stop, which is stationary and extends away from the bicycle frame, is located on a same rotation path of the second pedal crank, wherein once the second pedal crank has rotated enough the second pedal crank comes into contact with the third mechanical stop, thereby, preventing further rotation of the second pedal crank and allowing the second pedal crank to begin rotation in the opposite direction.

6. The bicycle drivetrain of claim 1, wherein the first slip clutch can slip clockwise with respect to the first shaft, but if the first slip clutch rotates counter-clockwise with respect to the first shaft, then the first slip clutch will prevent the first shaft from slipping,
   wherein the second slip clutch can slip clockwise with respect to the second shaft, but if the second slip clutch rotates counter-clockwise with respect to the second shaft, then the second shaft will slip.

7. The bicycle drivetrain of claim 6, wherein the first sprocket has a smaller diameter than the second sprocket and further wherein a ratio of the diameter of the first sprocket to a diameter of the second sprocket is equal to a ratio of the length of the first pedal crank to the length of the second pedal crank.

8. The bicycle drivetrain of claim 7, wherein when a angle between the first pedal crank and the second pedal crank is small enough, arcuate paths of the first pedal and the second pedal are similar.

9. The bicycle drivetrain of claim 1, wherein the first spur gear has a smaller diameter than the second spur gear and the first pedal crank is shorter than the second pedal crank and further wherein a ratio of the diameter of the first spur gear to a diameter of the second spur gear is equal to a ratio of a length of the first pedal crank to a length of the second pedal crank.

10. The bicycle drivetrain of claim 1, wherein the first pedal crank rotates about an axis that is in front of an axis that the second pedal crank rotates about.

11. The bicycle drivetrain of claim 1, further comprising a first pedal shaft that connects the first pedal to the first pedal crank and a second pedal shaft that connects the second pedal to the second pedal crank, wherein the first pedal shaft can freely rotate within the first pedal crank and the second pedal shaft can freely rotate within the second pedal crank.

12. The bicycle drivetrain of claim 1, further comprising a housing secured to the bicycle frame, wherein the housing is configured to house and protect at least one of the first shaft or the second shaft.

13. The bicycle drivetrain of claim 1, wherein the main sprocket is oval in shape rather than circular.

14. The bicycle drivetrain of claim 1, wherein a derailleur is incorporated into the bicycle drivetrain.

15. The bicycle drivetrain of claim 1, wherein the first pedal and the second pedal do not attach a rider's feet to the first pedal and the second pedal.

16. The bicycle drivetrain of claim 1, wherein rotating the first shaft clockwise will rotate the second spur gear and the second shaft counter-clockwise, thereby, raising the second pedal.

17. The bicycle drivetrain of claim 1, wherein the first pedal and the second pedal are a same distance outboard from the bicycle frame.

* * * * *